US011014413B2

(12) United States Patent
Räisänen et al.

(10) Patent No.: US 11,014,413 B2
(45) Date of Patent: May 25, 2021

(54) TIRE WITH AN INSERT CONFIGURED TO MEASURE WEAR OF A TREAD

(71) Applicant: Nokian Renkaat Oyj, Nokia (FI)

(72) Inventors: Jani Räisänen, Pirkkala (FI); Jari Ojala, Nokia (FI); Teemu Soini, Tampere (FI); Simo Vapaakoski, Tampere (FI); Mikko Turunen, Akaa (FI); Timo Oksjoki, Lempäälä (FI)

(73) Assignee: Nokian Renkaat Oyj, Nokia (FI)

( * ) Notice: Subject to any disclaimer, the term of this patent is extended or adjusted under 35 U.S.C. 154(b) by 0 days.

(21) Appl. No.: 16/768,899

(22) PCT Filed: Dec. 11, 2018

(86) PCT No.: PCT/FI2018/050904
§ 371 (c)(1),
(2) Date: Jun. 2, 2020

(87) PCT Pub. No.: WO2019/122507
PCT Pub. Date: Jun. 27, 2019

(65) Prior Publication Data
US 2020/0338932 A1    Oct. 29, 2020

(30) Foreign Application Priority Data
Dec. 18, 2017    (EP) ..................................... 17397531

(51) Int. Cl.
*B60C 11/24*    (2006.01)
*G01M 17/02*    (2006.01)
*B29D 30/00*    (2006.01)

(52) U.S. Cl.
CPC ........ *B60C 11/243* (2013.01); *B29D 30/0061* (2013.01); *B60C 11/246* (2013.01); *G01M 17/02* (2013.01); *B29D 2030/0083* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 7,404,319 B2    7/2008    Poulbot et al.
2005/0007239 A1    1/2005    Woodard et al.
(Continued)

FOREIGN PATENT DOCUMENTS

DE    19745734 A1    4/1999
DE    197455734 A    4/1999
(Continued)

OTHER PUBLICATIONS

Allowance Notification for Japanese Patent Application No. 2020-533150 dated Mar. 9, 2021, 3 pages.

*Primary Examiner* — Andre J Allen
(74) *Attorney, Agent, or Firm* — Berggren LLP (57) ABSTRACT

A tire comprising a tread block made of tread material, a tread, of which a part is formed by the tread block, and an insert comprising a primary capacitive component and a primary inductive component. The insert extends in a longitudinal direction from a bottom of the insert to a top of the insert. The insert has a first cross section at a first longitudinal position and a second cross section at a second longitudinal position, wherein the first longitudinal position is located closer to the tread of the tire than the second longitudinal position, and the second cross section is greater than the first cross section. At least a part of the top of the insert does not form an interface with the tread material. A method for applying an insert into a tire. An insert is inserted into a blind hole of the tire such that the bottom of the insert is inserted deeper in the blind hole than the top of the insert.

13 Claims, 8 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
See application file for complete search history.

(56) References Cited

U.S. PATENT DOCUMENTS

| | | |
|---|---|---|
| 2005/0061069 A1 | 3/2005 | Robert |
| 2006/0090558 A1* | 5/2006 | Raskas .................. B60C 11/24 73/146 |
| 2007/0175555 A1* | 8/2007 | Myatt .................... B60C 11/24 152/152.1 |
| 2009/0114322 A1 | 5/2009 | O'Brien |
| 2010/0276044 A1 | 11/2010 | Heise et al. |
| 2011/0221587 A1 | 9/2011 | Katou |
| 2014/0166168 A1* | 6/2014 | Engel .................... B60C 11/243 152/154.2 |
| 2014/0360256 A1 | 12/2014 | Orlewski |
| 2016/0031272 A1 | 2/2016 | Piene et al. |
| 2020/0101797 A1* | 4/2020 | Ojala .................... B60C 11/24 |

FOREIGN PATENT DOCUMENTS

| | | |
|---|---|---|
| DE | 20216290 U1 | 1/2003 |
| EP | 3424753 A1 | 1/2019 |
| FR | 2835218 A1 | 8/2003 |
| JP | 2005504673 A | 2/2005 |
| JP | 2007-161246 A | 6/2007 |
| JP | 2007161246 A | 6/2007 |
| JP | 2007-333622 A | 12/2007 |
| JP | 2007333622 A | 12/2007 |
| JP | 2020-525350 A | 8/2020 |
| NO | 2015-019291 A1 | 2/2015 |
| NO | 2015-083072 A1 | 6/2015 |
| WO | 2015019291 A1 | 2/2015 |
| WO | 2015083072 A1 | 6/2015 |

* cited by examiner

TIRE WITH AN INSERT CONFIGURED TO MEASURE WEAR OF A TREAD

PRIORITY

This application is a U.S. national application of the international application number PCT/FI2018/050904 filed on Dec. 11, 2018, which claims priority of European application EP17397531.9 filed on Dec. 18, 2017, the contents of all of which are incorporated herein by reference.

TECHNICAL FIELD

The invention relates to tires with electrical wear indicators. The invention relates to tires with wear indicators based on an LC or LCR resonator of which inductance and/or oscillation frequency in configured to change as a surface of the tire wears.

BACKGROUND

Remote monitoring systems employing LCR (inductance-capacitance-resistance) or LC (inductance-capacitance) circuits are known e.g. from a document US 2005/0007239. In connection with an interrogation means, such circuits enable monitoring of a variety of properties, including strain, temperature, pressure, identification, performance, chemical phase transition (such as melting and state-of-cure), fluid level, wear, rotation rate, location and proximity. In general, the LC or LCR circuit is passive, e.g. free from an electric source that converts chemical energy into electricity, even if the inductance itself is used to produce electricity by a varying magnetic field. However, the interrogation means is active, including an electric source that converts chemical energy into electricity. Typically the interrogation means is a hand held device or a device fixed to a system. The position of the interrogation means relative to the circuit can be reasonably freely chosen. However, the power consumption of the interrogation means depends on the reading distance.

Such devices can be applied to measure wear of a tire, as disclosed in the document US2005/0061069. However, it has been noticed, that the attachment of the LC or LCR circuit to a tire in a reliable manner is hard. First, because the wear is to be measured, the LC or LCR circuit must be applied on the tread of the tire or into the tread of the tire. Applying the LC or LCR circuit during manufacturing, e.g. during vulcanizing, may be hard, because the location of the circuit should be well controlled for accurately measuring the wear. If applied after the vulcanization, attachment of the circuit with the rest of the tire poses a problem. In use the tire rotates, which generates centrifugal forces to the LC or LCR circuit pushing the LC or LCR circuit away from the tread. For example, in a passenger car driving at 100 km/h, the centrifugal forces may correspond to an acceleration of 200 times the gravitational acceleration. Such forces have been found to oftentimes move the circuit from the tread. Moreover, even if the LC or LCR circuit is not completely pushed away from the tire, displacement of the circuit within the tire affects the accuracy of the wear measurements. The document US2005/0061069 indicates that this problem could be addressed by inserting the circuit to the tire from inside the tire. However, in such a case, the reinforcement structures of the present in a tire would have to be penetrated, which would deteriorate the mechanical properties of the tire. In addition, the air tightness of the tire would be at risk, when the circuit is exposed from both inner and outer sides of the tire.

SUMMARY

It has been found that the LC or LCR circuit can be reliably fixed into a tire into a precisely defined location when the LC or LCR circuit forms an insert having such a shape that it locks with the tire because of the shape. Correspondingly, a cross section of the insert is larger deeper inside the tire than closer to the tread (i.e. surface of the tire). Moreover, in order to arrange the insert into a precisely defined location, the insert can be arranged in a blind hole of a tread of the tire. This is disclosed in more specific terms in the independent claim(s). In addition, adhesive can be applied to improve the attachment between the insert and the tire. A corresponding method is disclosed in the independent claim(s).

Moreover, in such an insert the different parts of the LC or LCR circuit can be applied in different parts of the insert. Having such a structure, wherein the inductive component is arranged in such a part of the insert that has a large cross section improves the readability of the LC or LCR circuit.

Preferred embodiments are disclosed in the dependent claims. These and other embodiments are disclosed in the description and figures.

BRIEF DESCRIPTION OF THE DRAWINGS

FIGS. 2a1 and 2a2 show, in side views, embodiments of a wear indicator,

DETAILED DESCRIPTION

Figure 1:
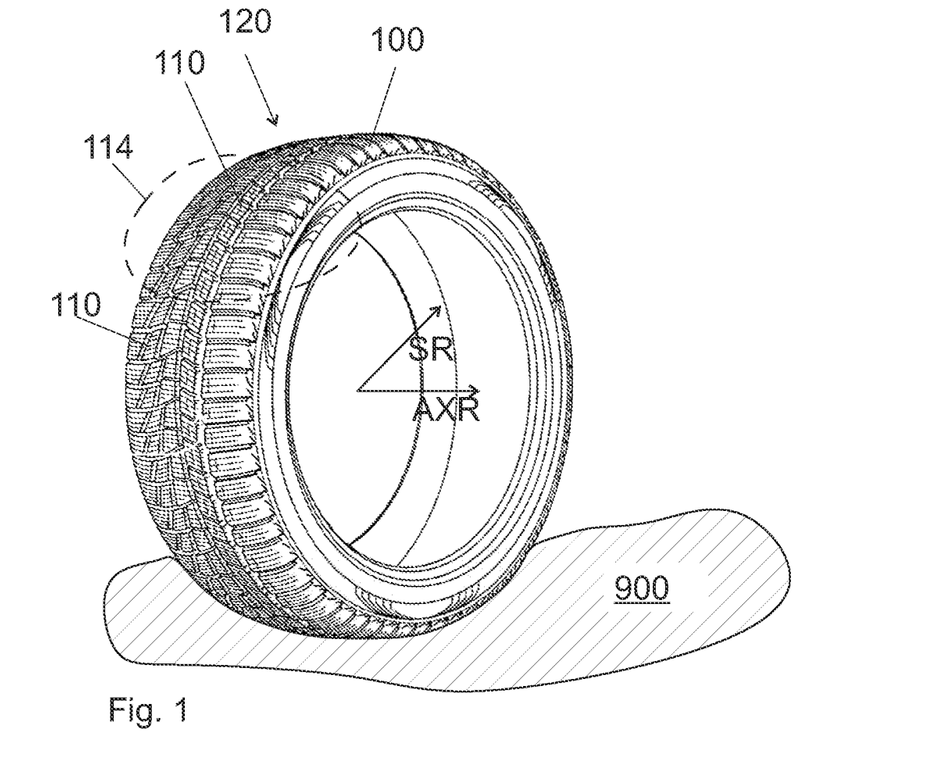
FIG. 1 shows a tire

Referring to FIG. 1, the embodiments relate to a tire 100 comprising a part of a wear indicator 190. Preferably, the tire 100 is a pneumatic tire. In general, a tire 100 has a tread 120. The tread 120 is the part of the tire that is configured to form a contact with a surface 900, such as road or ground, when the tire 100 is used. Typically, the tread 120 is formed of tread blocks 110. Correspondingly, a part of the tread 120 is formed by a tread block 110. A top surface of a tread block 110 is a part of the tread 120. The tire 100 may be a non-pneumatic tire. The tire 100 may be a tire for a passenger vehicle, such as a passenger car tire, such as a pneumatic tire for a passenger car. The tire 100 may be a heavy tire, i.e. a tire for a heavy machine, such as a forwarder, a loader, a truck, a caterpillar. The tire 100 may be a tire for a motorcycle.

Figure 2A:
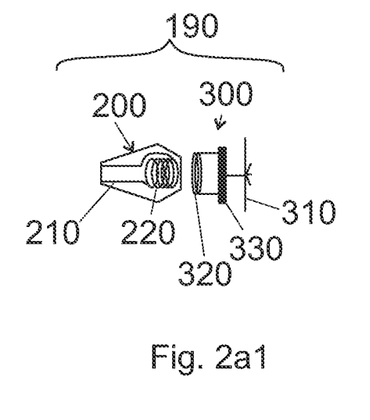
Figure 2A:
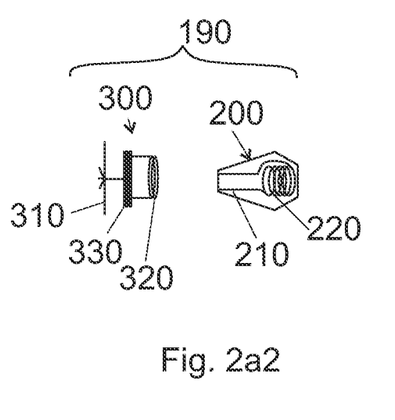
Figure 2B:
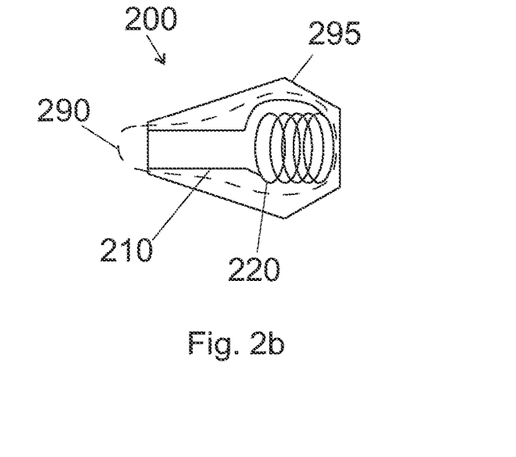
FIG. 2b shows an insert, wherein a circuit is arranged in a shell.

The wear indicator 190 comprises an interrogator 300 and a circuit 290, as indicated in FIGS. 2a1, 2a2, and 2b. Referring to FIG. 2b, the circuit 290 is arranged in an insert 200 that is insertable into the tire 100. The insert 200 may further comprise a shell 295, in which the circuit 290 is arranged. The circuit 290 comprises at least some electronic components, such as a primary inductive component 220. Referring to FIGS. 2a1 and 2a2, the interrogator 300 is configured to interact with the insert 200 wirelessly, as detailed below. When used, the inductors 320, 220 of the interrogator 300 and the insert 200, respectively, can be arranged next to each other, as indicated in FIG. 2a1. In the alternative, other components of the circuit may be arranged in between the inductors 320, 220 as indicated in FIG. 2a2.

Figure 3A:
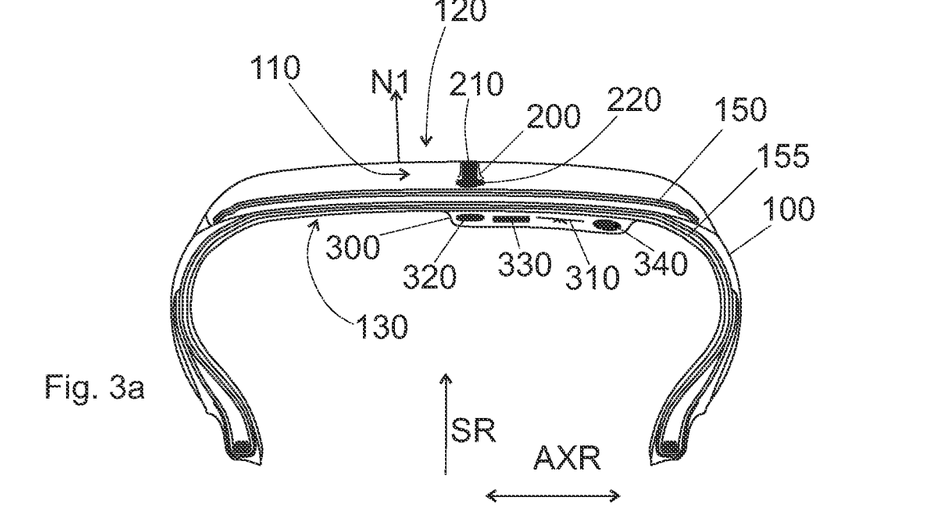
FIG. 3a shows a half of a cross section of a tire having wear indicator, the interrogator of the wear indicator being integrated in the tire.
Figure 3B:
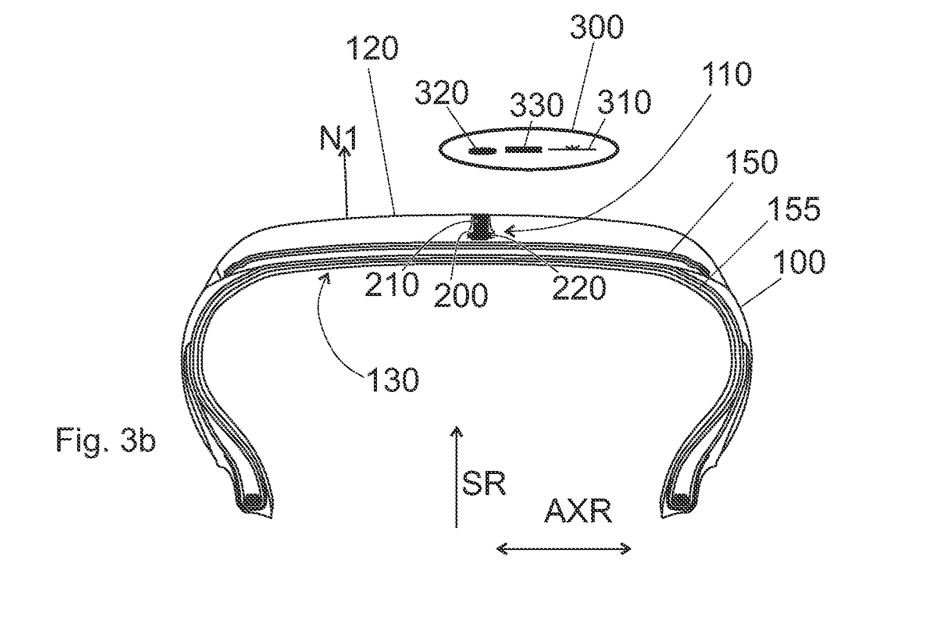
FIG. 3b shows a half of a cross section of a tire having an interrogator, the interrogator of the wear indicator being arranged outside the tire.

The insert 200 is arranged in a tire 100, as indicated in FIGS. 3a and 3b. In the embodiment of FIG. 3a, the tire 100 further comprises the interrogator 300. In this embodiment, the inductors 320, 220 of the interrogator 300 and the insert 200 are arranged in a similar manner as in FIG. 2a1. In the embodiment of FIG. 3b, the interrogator 300 is arranged elsewhere, e.g. on a part of a vehicle that has the tire 100. In this embodiment, the inductors 320, 220 of the interrogator 300 and the insert 200 are arranged, when the insert is read, in a similar manner as in FIG. 2a2.

In an embodiment, the insert 200 is arranged in a tire 100 in such a way that a capacitive component 210 thereof wears, as the tread 120 of the tire wears.

The insert 200 comprises a primary capacitive component 210 and a primary inductive component 220. The primary capacitive component 210 is electrically connected to the primary inductive component so as to form an electric oscillator. The insert 200 may further comprise a resistive component 250 (e.g. FIGS. 2f and 2g). The oscillator is thus an LC or an LRC oscillator. Preferably, the insert 200 is energetically passive, i.e. it is free from a battery configured to convert chemical energy to electricity. The primary inductive component 220 transforms magnetic energy to electricity, which becomes temporarily stored in the primary capacitive component 210, as per se known from an LC or an LCR oscillator. The oscillation frequency and/or the inductance of the insert 200 is/are dependent on the capacitance of the primary capacitive component 210 and the inductance of the primary inductive component 220. Typically, the angular resonant frequency of the insert is expressed as $\omega = 1/\sqrt{L_0 \times c_0}$, wherein $L_0$ is the inductance of the primary inductive component 220 and $c_0$ is the capacitance of the primary capacitive component 210. As will be detailed below, in an embodiment, the primary capacitive component 210 is configured to wear in use, whereby its capacitance $c_0$ changes. This affects e.g. the angular resonant frequency $\omega$. This affects also the mutual inductance, in particular at a certain frequency, of the primary inductive component 220 and a secondary inductive component 320 (e.g. secondary inductive component 320 of the interrogator 300). In this way, e.g. these quantities are indicative of how much the primary capacitive component 210 has worn. However, also other quantities may affect the capacitance $c_0$ of the primary capacitive component 210. Thus, e.g. the aforementioned quantities may be indicative of also other parameters of the primary capacitive component 210 or the environment nearby the primary capacitive component 210, such as moisture near the primary capacitive component 210 and/or moisture e.g. in between two electrodes (214, 216) of the primary capacitive component 210.

The primary capacitive component 210 need not wear during measurements. It is possibly, for example, to measure the humidity of the environment, wherein the insert is embedded. As known, the humidity affects the dielectric constant of a capacitor, and thus also the angular resonant frequency $\omega$ of the LC insert. In addition or alternatively, the inductance of the primary inductive component 220 may be affected by the environment and/or use of the device 100. For example, if the tread block 110 of the tire 100 comprises magnetic material, the inductance of the primary inductive component 220 may change as the tread block 110 wears. In addition or alternatively, the insert 200 may comprise a primary sensor arrangement 240 (FIG. 2e) for measuring some other quantities. The primary sensor arrangement may comprise a sensor or sensors that require only a little electricity for functioning. The primary sensor arrangement 240 may comprise e.g. at least one of a pressure sensor, a humidity sensor, and a temperature sensor.

In addition, the capacitance $c_0$ of the primary capacitive component 210 need not change. Referring to FIGS. 2f and 2g, in an embodiment the circuit comprises a primary resistive component 250 configured to wear. The circuit further comprises the primary capacitive component 210 for forming the oscillator. However, as the resistance of the primary resistive component 250 changes, for example increases, as a result of removal of some resistors electrically in parallel, a transient response of the circuit changes, in particular at the resonant frequency. This may be measured by an interrogator 300 to determine the resistance of the primary resistive component 250 and/or the wear of the insert 200.

The interrogator 300 comprises an electric source 330, a communication insert 310, and a secondary inductive component 320. The electric source 330 is needed to power the interrogator 300. The electric source 330 may be e.g. configured to transform mechanical and/or chemical energy to electric energy. As an alternative or in addition, the electric source may comprise a component configured convert magnetic energy into electricity. As an alternative or in addition, the electric source may comprise high-capacitance capacitor (e.g. a super capacitor) storing electric energy as such. Such a high-capacitance capacitor can be charged e.g. inductively or mechanically with a component transforming magnetic or mechanical energy, respectively, to electricity. A high-capacitance capacitor herein refers to a capacitor having a DC capacitance of at least 1 µF.

The secondary inductive component 320 is used to interrogate the insert 200. Thus, by forming a magnetic field to the secondary inductive component 320, the magnetic field also penetrates the primary inductive component 220 thus affecting the mutual inductance of the interrogator 300 and the insert 200. In this way, at least one of the mutual inductance, the angular resonant frequency (or the resonant frequency), the bandwidth, and the Q-factor of the insert 200 (in particular the circuit 290) can be measured. When the capacitance is configured to change, preferably at least one of the mutual inductance and the angular resonant frequency (or the resonant frequency) is measure. When the resistance is configured to change, preferably at least one of the bandwidth and the Q-factor is measured.

The communication circuit 310 may be used to communicate the measured data to a gateway device. The communication circuit 310 may comprise a control circuit for measuring the mutual inductance and/or the resonant frequency and/or the bandwidth, and/or the Q-factor of the insert. In the alternative, the interrogator 300 may comprise a separate control circuit for the purpose. In an embodiment, the interrogator 300 is configured to measure at least one of [i] a mutual inductance of the secondary capacitive component 320 and the insert 200, [ii] an inductance of the insert 200, and [iii] a resonance frequency of oscillation of the insert 200. In an embodiment, the interrogator 300 is configured to measure at least one of [iv] the bandwidth of the insert 200, and [v] the Q-factor of the insert 200.

Figure 2C:
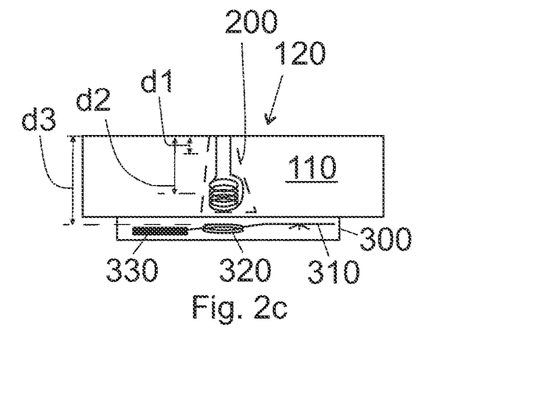
FIGS. 2c-2d show, in side views, a wear indicator inserted in a tread block of a tire.
Figure 2D:
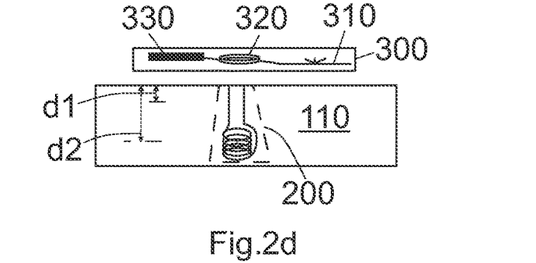
Figure 2E:
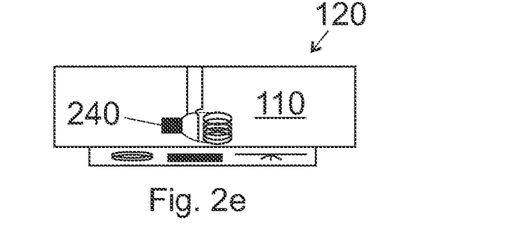
FIG. 2e shows an insert having an additional sensor.
Figure 2F:
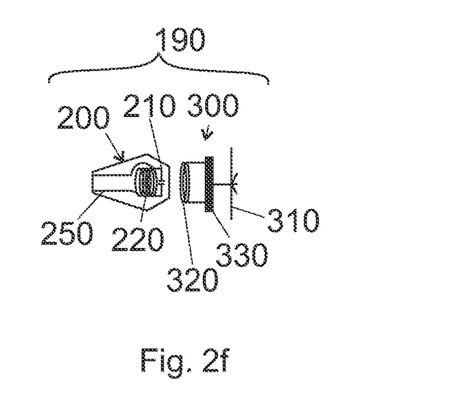
FIGS. 2f-2g show, in side views, a wear indicator having a resistive component configured to wear.
Figure 2G:
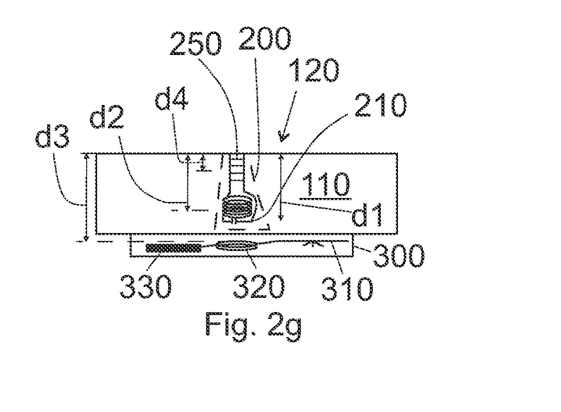

Referring to FIGS. 2c and 2d, such a wear indicator 190 can be used to measure wear of the tread 120. When using such a wear indicator 190, the insert 200 is applied to the tread 120 in such a way that a part of it wears as the tread 120 wears. In an embodiment (e.g. FIGS. 2a1 to 2e), the primary capacitive component 210 is configured to wear as the tread 120 wears. In an embodiment (e.g. FIGS. 2f and 2g), a primary resistive component 250 is configured to wear as the tread 120 wears. Even if not shown, in an embodiment, both the primary capacitive component 210 and the primary resistive component 250 are configured to wear as the tread 120 wears.

The wearing component (i.e. the primary capacitive component 210 and/or the primary resistive component 250) needs not to reach the surface of an unworn tread 120, since it may suffice to measure the wear of only such a tread that has worn a reasonable amount. However, preferably, only the wearing component (e.g. primary capacitive component 210) wears, but not the primary inductive component 220. Therefore and with reference to FIGS. 2c and 2d, in an embodiment, the insert 200 is arranged in the tire 100 in such a way that the primary capacitive component 210 is configured to wear as the tread 120 wears. Moreover, at least a part of the primary capacitive component 210 is arranged a first distance d1 apart from the first surface the body and inside a tread block 110. Furthermore, at least a part of the primary inductive component 220 is arranged a second distance d2 apart from the tread 120 and inside the tread block 110. In a tire 100, the second distance d2 is preferably greater than the first distance d1. In this way, as the tread 120 wears, the primary capacitive component 210 starts to wear before the primary inductive component 220 starts to wear. Preferably the insert 200 is arranged in such a way that, in normal use, the primary inductive component 220 does not wear.

In the embodiment, where the primary resistive component 250 wears, but not the primary inductive component 220, the insert 200 is arranged in the tire 100 in such a way that the primary resistive component 250 configured to wear as the tread 120 wears. In that embodiment, at least a part of the primary resistive component 250 is arranged a fourth distance d4 apart from the first surface the body and inside a tread block 110. Furthermore, at least a part of the primary inductive component 220 is arranged a second distance d2 apart from the tread 120 and inside the tread block 110. In such a tire 100, the second distance d2 is preferably greater than the fourth distance d4. In general, the second distance d2 is preferably greater than the distance (d1, d4) in at which at least a part of the wearing component (210, 250) is arranged. In this way, as the tread 120 wears, the wearing component (i.e. the primary capacitive component 210 and/or the primary resistive component 250) starts to wear before the primary inductive component 220 starts to wear. Preferably the insert 200 is arranged in such a way that, in normal use, the primary inductive component 220 does not wear.

Moreover, as indicated above, in some other embodiments the second distance d2 may be less than the first distance d1 (and optionally also the fourth distance d4), because no parts of the insert need to wear, e.g. in case the insert 200 functions only as a humidity sensor.

Referring to FIGS. 2a1 and 3a, in an embodiment, the tire 100 comprises the interrogator 300. In such an embodiment, the interrogator 300 is arranged, relative to the insert 200, in such a way that the secondary inductive component 320 is arranged on the same side of the tread 120 as the primary inductive component 220. The secondary inductive component 320 may be arranged inside the tire 100 or on another surface of the tire 100. Moreover, at least a part of the secondary inductive component 320 is arranged a third distance d3 apart from the tread 120, the third distance d3 being greater than the second distance d2. This has the effect that also the secondary inductive component 320 does not start to wear until the primary inductive component 220 starts to wear (if it is to wear). This has the further effect that such a placement improves the magnetic coupling between the primary inductive component 220 and the secondary inductive component 320.

Referring to FIG. 3a, in a preferred embodiment, the interrogator 300 is arranged on a second surface 130 of the tire 100, wherein the second surface 130 is opposite to the tread 120. The second surface may be a surface of a cavity limited by a tire 100. For example, the second surface 130 may be a surface of an interior of a pneumatic tire 100. In particular, when the interrogator 300 is arranged inside a pneumatic tire, the interrogator may be used to measure also other quantities, e.g. pressure and/or temperature. For such a purpose, in an embodiment, the interrogator 300 comprises a secondary sensor arrangement 340. Such a secondary sensor arrangement 340 comprises sensor or sensors configured to measure the environment in which the interrogator 300 is. The secondary sensor arrangement 340 may comprise e.g. at least one of a temperature sensor, a pressure sensor, and an acceleration sensor.

Figure 4A:
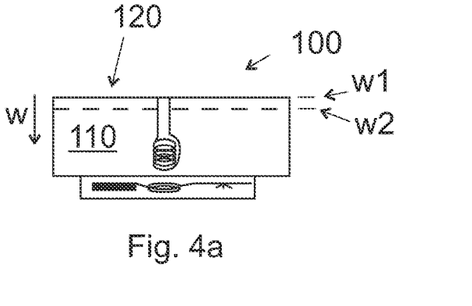
FIGS. 4a-4b show an operating principle of a wear indicator.

Referring to FIG. 4a, in general, the amount of wear is referred to with a symbol w. FIG. 4a indicates two values of wear, w1 and w2. In FIG. 4a, the value of wear w1 refers to the value of wear w1 of the tread 120 of FIG. 4a. For example, in FIG. 4a the tread 120 may be e.g. unworn, and the value of wear w1 may be e.g. zero.

Figure 4B:
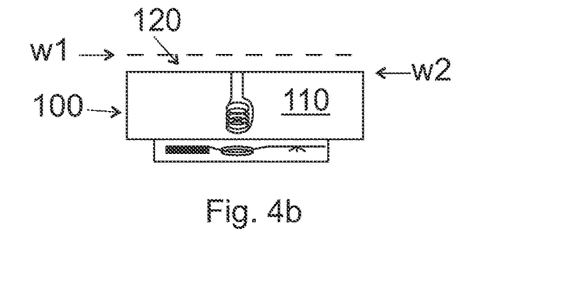

FIG. 4b shows the tread 120 of FIG. 4a after the tread 120 has worn some amount. The value of wear of FIG. 4b corresponds to w2. Thus, the tread 120 has worn by an amount of w2−w1 in between the FIGS. 4a and 4b.

Since the primary capacitive component 210 and/or the primary resistive component 250 is/are configured to wear by the same amount as the tread 120, preferably, the insert 200 resists wear at most to the same degree as the tread block 110. In other words, preferably, the material of the primary capacitive component 210 and a top part of the insert 200 resists wear at most to the same degree as the tread material of tread block 110. The top part of the insert 200 comprises the top 204 of the insert 200 (see e.g. FIG. 5). This ensures that the primary capacitive component 210 wears, in use, by the same amount as the tread 120; at least when the tread 120 has worn to the limit where the primary capacitive component 210 starts to wear. It has been found that some polymers, in particular polyamide resist wear to substantially the same degree as the tread block 110. The wear of the insert 200 may be affected by applying reinforcement material, such as glass fibres, aramid fibres or carbon fibres. In an embodiment, the insert comprises polymer. In an embodiment, the insert comprises polymer and fibrous material, such as such as glass fibres, aramid fibres or carbon fibres. In an embodiment, insert comprises polyamide. In an embodiment, the insert comprises polyamide and fibrous material, such as such as glass fibres, aramid fibres or carbon fibres.

The primary capacitive component 210 may comprise capacitors $210_1$, $210_2$, $210_3$, $210_4$, as shown in FIGS. 7a, 7b, 9a, 9b, 9c, 9d, and 10. In addition or alternatively, the primary capacitive component 210 may comprise a first electrode 214 and a second electrode 216 configured to form a capacitance and configured to wear as the insert 200 wears. Some exemplary electrode configurations are shown in the European patent application EP17397517.8, which is incorporated herein by reference. Also, as indicated therein, preferably the primary capacitive component 210 is configured such that for a first value of wear w1, the derivative of the capacitance c0 of the primary capacitive component 210 with respect to wear w has a first value of capacitance change dc0/dw|w1, for a second value of wear w2, the derivative of the capacitance c0 of the primary capacitive component 210 with respect to wear w has a second value of capacitance change dc0/dw|w2, wherein the first value of capacitance change dc0/dw|w1 is different from the second value of capacitance change dc0/dw|w2.

Preferably, the first value of wear w1 is smaller than the second value of wear w2 and an absolute value of the first value of capacitance change dc0/dw|w1 is larger than an absolute value of the second value of capacitance change dc0/dw|w2.

The aforementioned European patent application EP17397517.8 illustrates examples of preferable configurations of capacitors $210_1$, $210_2$, $210_3$, $210_4$ and/or electrodes 214, 216. For example, and with reference to FIG. 7a of the present application, such an effect can be achieved, when a capacitor $210_1$ close to the tread 120 has a capacitance greater than a capacitor $210_2$ further away from the tread 120.

As indicated in the background, one problem with these types of measurements is the attachment of the insert 200 into the tire 100 in a reliable manner. In principle, a reliable attachment could be made during vulcanization of the tire 100. However, this would double the number of product lines (i.e. one line of tire without such an insert, and another one with the insert), which would make the manufacturing process complex from the point of view of logistics. Another way would be to produce an insert having a flange, and insert the insert from the inner side into the tire 100 in such a way that the flange remains inside the tire. However, when the tire wears, such an insert would extend through the tire, which would impose gas leakage problems.

It has been realized that the insert 200 can be inserted into a blind hole 112 of the tire 100. Moreover, if the width of the blind hole 112 is larger near the bottom of the hole 112 than at a top of the hole 112, an insert having a similar shape remains reliably in the blind hole 112. Such a blind 112 hole may have been made to the tire e.g. by using a mould during vulcanization of the tire 100.

Figure 11A:
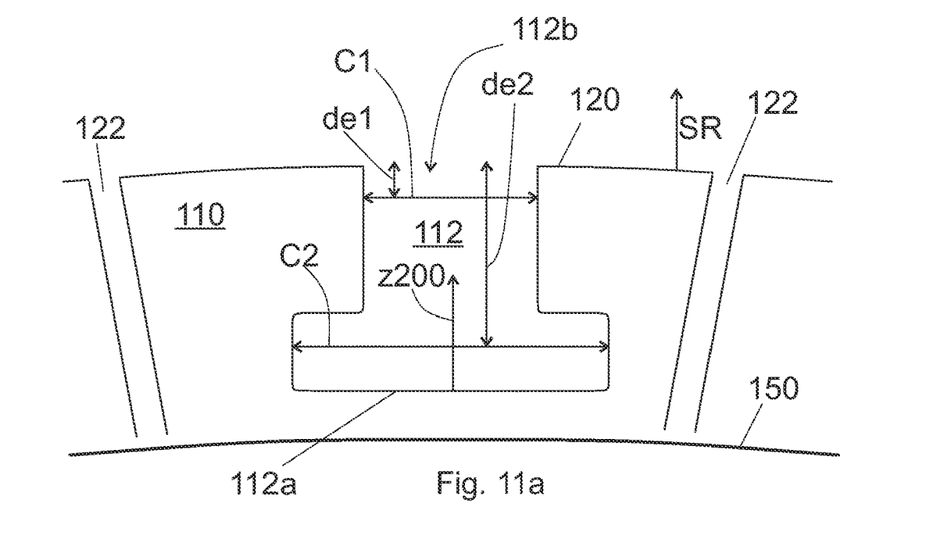
FIGS. 11a-11b illustrate a method for inserting an insert into a tire.
Figure 11B:
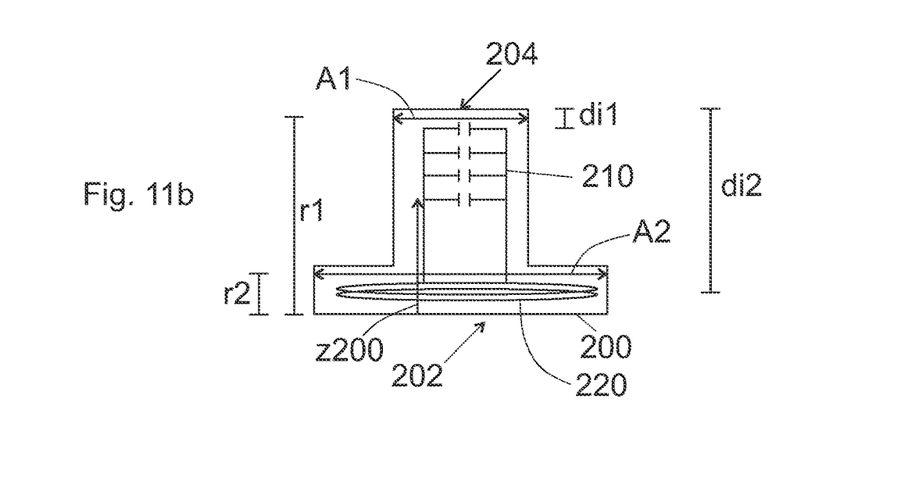

Referring to FIGS. 11a and 11b an embodiment of the method comprises arranging available an insert 200 as discussed above. Correspondingly, the insert comprises wearing component 210, 250, such as a primary capacitive component 210, of which at least a part is arranged a first secondary distance di1 apart from a top 204 of the insert 200 and a primary inductive component 220 of which at least a part is arranged a second secondary distance di2 apart from the top 204 of the insert 200. In an embodiment, wherein the primary capacitive component 210 is configured to wear, the second secondary distance di2 is greater than the first secondary distance di1. The insert 200 extends in a longitudinal direction z200 from a bottom 202 of the insert to the top 204 of the insert. Moreover, in order to have a mechanical locking of the insert 200 with the widening shape of the blind hole 112, the insert 200 has a first cross section A1 at a first longitudinal position r1 from the bottom 202 and a second cross section A2 at a second longitudinal position r2 from the bottom 202, wherein the first longitudinal position r1 is located closer to the top 204 than the second longitudinal position r2 and the second cross section A2 is greater than the first cross section A1. Herein the these cross-sections A1 and A2 are defined on a plane that has a normal that is parallel to the longitudinal direction z200. Even if not shown in the figures, with reference to FIGS. 2f and 2g, alternatively or in addition, the insert 200 may comprise a primary resistive component 250, of which at least a part is arranged a first secondary distance di1 apart from a top 204 of the insert 200. An area of the second cross section A2 may be e.g. at least 10%, at least 25%, at least 50%, or at least 100% greater than an area of the first cross section A1. A ratio of the area of the second cross section A2 to the area of the first cross section A1 may thus be, for example, from 1.1 to 10, such as from 1.25 to 7, such as from 1.5 to 5, such as from 2 to 4.

Figure 6:
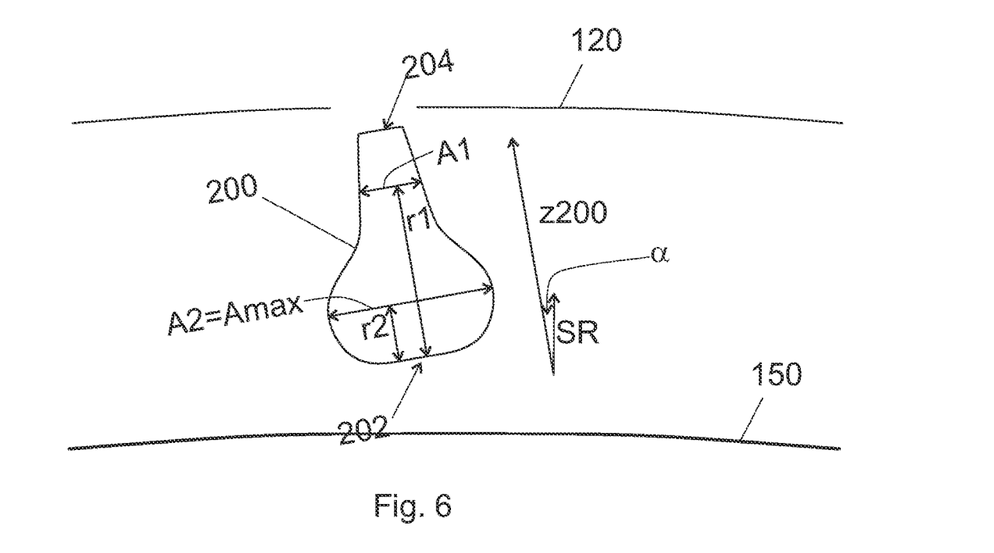
FIG. 6 shows, as a side view, a part of a tire having an insert according a second embodiment.

Moreover, the method comprises arranging available the tire 100, to which the insert 200 is to be inserted. A blind hole 112 has been arranged to the tire 100, as discussed above. In the method, the tire comprises such a blind hole 112 that the blind hole 112 has a first cross-section C1 at a first depth de1 and a second cross-section C2 at a second depth de2, wherein the second cross-section C2 is greater than the first cross-section C1 and the second depth de2 is greater than the first depth de1. This has the effect that the insert 200 can be kept in its place by a shape-locking effect of the insert 200 and the blind hole 112. It is also noted, that in an embodiment, the second cross section A2 of the insert 200 is greater than the first cross-section C1 of the blind hole 112. Furthermore the blind hole 112 is formed in such a way that the blind hole 112 extends from is bottom 112a to an aperture 112b in the tread block 110 in a longitudinal direction z200. The longitudinal direction z200 is parallel to with a radial direction SR (as in FIG. 11a) of the tire at the location of the blind hole 112 or forms an angle α (see FIG. 6) of at most 75 degrees with a radial direction SR of the tire at the location of the blind hole 112. The aforementioned aperture 112b in the tread block 110 may be considered to be a top of the blind hole 112. The cross sections C1 and C2 are defined by a plane that has a normal that is parallel to the longitudinal direction z200. What has been said about the sizes of the first and second cross sections A1 and A2 of the insert 200 relative to each other, applies to the first and second cross sections C1 and C2 of the blind hole 112.

Figure 7A:
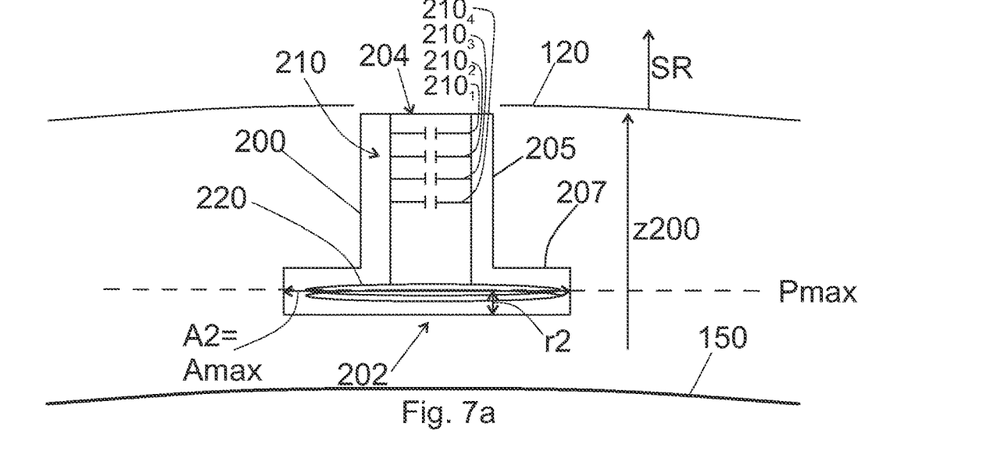
FIG. 7a shows, as a side view, a part of a tire having an insert according a third embodiment.
Figure 7B:
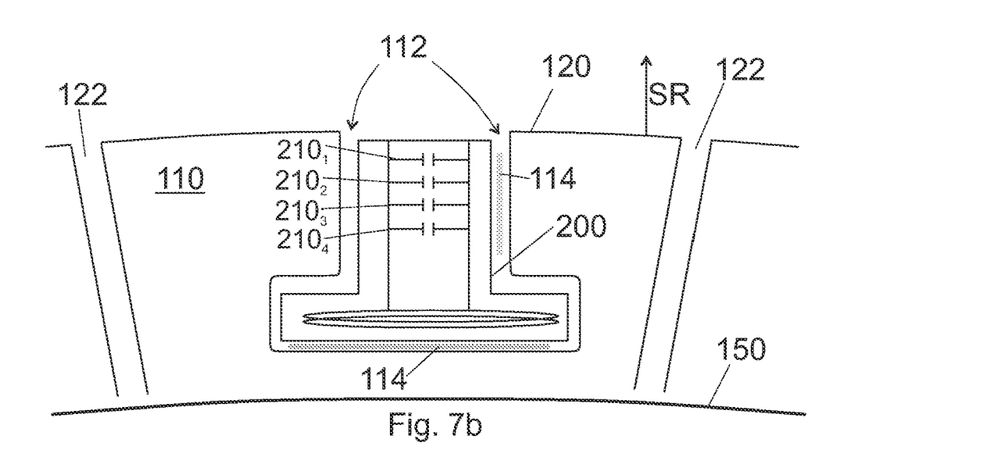
FIG. 7b shows, as a side view, a part of a tire having an insert of FIG. 7a inserted in a blind hole.

Moreover, the insert 200 is inserted into the blind hole 112 such that the bottom 202 of the insert 200 is inserted deeper in the blind hole 112 than the top 204 of the insert 200. An example of a tire 100 such formed is shown in FIG. 7b. It is also noted that the part of the blind hole 112 having the smaller cross section C1 needs to be expanded while the insert 200 is inserted into the blind hole 112. This may be made e.g. with suitable jaws, since the material of the tread block 110 is sufficiently elastic. Thus, in an embodiment, the tread block 110 is made of tread material that is elastic. In an embodiment, the tread material has a Shore hardness of from 50 ShA to 80 ShA at a temperature of 23° C. The unit ShA refers to the hardness test with a durometer of the type "A" as defined in the standard ASTM D2240-00. At least tread blocks 110 having a Shore hardness at that range can be expanded in the way described above.

In case it is hard to push the insert 200 into the blind hole 112, the process can be made easier by applying a suitable friction-reducing compound onto the insert 200 or into the blind hole 112 before pushing the insert into the blind hole. Suitable friction-reducing compounds include oil, grease, and soap.

The adhesion may be improved by applying adhesive 114 in between the insert 200 and the tread block 110.

Correspondingly, the blind hole 112 is at least partly filled with the insert 200. FIGS. 3a, 3b, 5, 6, 7a, 7b, and 8 show a part of a tire 100 having been made by the method.

Figure 5:
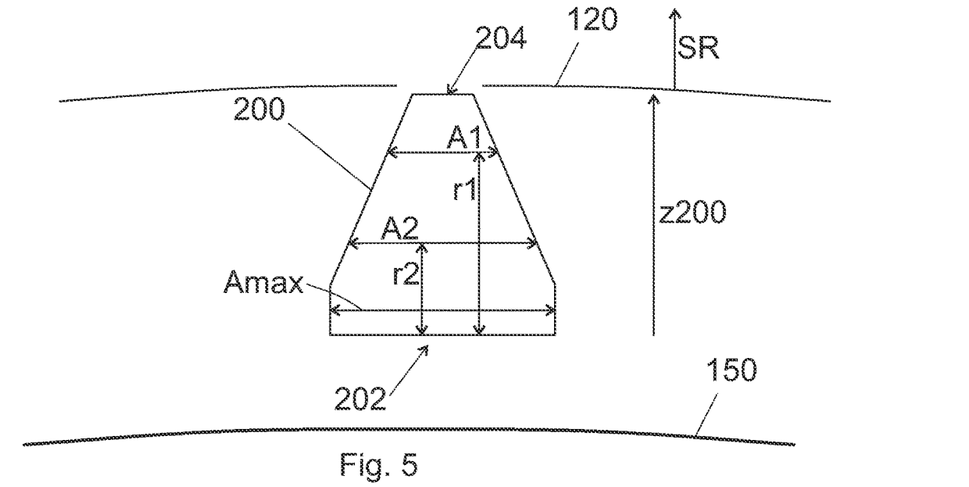
FIG. 5 shows, as a side view, a part of a tire having an insert according a first embodiment.

Referring in particular to FIGS. 3a and 5, such a tire 100 comprises the tread block 110 made of the tread material and the tread 120, of which a part is formed by the tread block 110. The the tread 120 is configured to form a contact with a surface 900, when the tire 100 is used. The tire 100 further comprises the insert 200. As indicated above, the insert 200 comprises the primary capacitive component 210 and the primary inductive component 220. In an embodiment, at least a part of a wearing component (210, 250), such as the primary capacitive component 210, is arranged a first distance d1 (or fourth distance d4) apart from the tread 120 and inside the tread block 110. In addition, at least a part of the primary inductive component 220 is arranged a second distance d2 towards the interior of the tire 100 from the tread 120. The insert 200 extends in a longitudinal direction z200 from a bottom 202 of the insert to a top 204 of the insert. In an embodiment, the longitudinal direction z200 is parallel to a radial direction SR of the tire at the location of the insert 200 (see e.g. FIG. 5). In an embodiment, the longitudinal direction z200 forms an angle α of at most 75 degrees with a radial direction SR of the tire at the location of the insert 200 (see FIG. 6).

To have the shape-locking effect, the insert 200 has a first cross section A1 at a first longitudinal position r1 and a second cross section A2 at a second longitudinal position r2. The first longitudinal position r1 is located closer to the tread 120 of the tire 100 than the second longitudinal position r2, and the second cross section A2 is greater than the first cross section A1.

Moreover, because of having been inserted into a blind hole 112 arranged in the tread 120 (and not on the inner side of the tire 100), at least a part of the top 204 of the insert 200 does not form an interface with the tread material of the tread block 110. The top 204 of the insert may be flush with the tread 120. Thus, the top 204 of the insert 200 may be arranged at a same level as the tread 120. However, the insert 200 may be arranged deeper in the blind hole 112 (and/or a body part 205 may be made short) so that an empty space remains on top of the top 204 of the insert 200. In addition, the empty space may be filled with some material.

When top 204 of the insert is flush with the tread 120, the aforementioned first distance d1 equals the first secondary distance di1 and the second distance d2 equals the second secondary distance di2. However, as indicated above, the top 204 of the insert needs not to be flush with the tread 120.

As the insert 200 has been inserted in a blind hole 112, in an embodiment, the tire 100 limits a blind hole 112 arranged in the tread block 110. Moreover at least a part of the insert 200 has been arranged in the blind hole 112; and at a time of observation, at least a part of the insert 200 is in the blind hole 112. Preferably, the insert 200 does not protrude from the tread. Thus, in an embodiment, the whole insert 200 has been arranged in the blind hole 112; and at a time of observation, the whole insert 200 is in the blind hole 112.

Moreover, if adhesive 114 is used in the method, the tire 100 comprises adhesive 114 in between the insert 200 and the tread block 110.

In an embodiment, wherein the primary capacitive component 210 is configured to wear before the primary inductive component 220, the first distance d1 is less than the second distance d2.

Typically, a tire 100 comprises a reinforcing belt 150, the purpose of which is to reinforce the tire 100. The reinforcing belt 150 may be a wire mesh or a belt arranged inside the tire 100. Since the purpose of the reinforcing belt 150 is to reinforce the tire, preferably, the reinforcing belt 150 does not limit large apertures. Thus, preferably, the blind hole 112 does not penetrate the reinforcing belt 150. In such a case, in the tire 100, the insert 200 (i.e. the whole insert 200) is left on an outer side of the reinforcing belt 150. More precisely, preferably, the reinforcing belt 150 does not limit an aperture having an area of at least 0.5 cm$^2$. In an embodiment, a part of the first reinforcing structure 150 is arranged in between the primary inductive component 220 and the secondary inductive component 320.

The first reinforcing belt 150 may comprise metal. The first reinforcing belt 150 may comprise steel, or it may consist of steel. The first reinforcing structure 150 may comprise a steel mesh. In addition or alternatively, the first reinforcing belt 150 may comprise fibrous material. The fibrous material of first reinforcing belt 150 may comprise at least one of cotton, rayon, polyamide (Nylon), polyester, polyethylene terephthalate, and Poly-paraphenylene terephthalamide (Kevlar).

Referring to FIGS. 3a and 3b, in an embodiment, the tire comprises a ply 155. Also a part of the ply 155 may be arranged in between the primary inductive component 220 and the secondary inductive component 320. The ply 155 may comprise fibrous material. The fibrous material of second reinforcing structure 155 may comprise at least one of cotton, rayon, polyamide (Nylon), polyester, polyethylene terephthalate, and Poly-paraphenylene terephthalamide (Kevlar). The purpose of the ply 155 is also to reinforce the tire 100. In an embodiment, the insert 200 (i.e. the whole insert 200) is left on an outer side of the ply 155. In an embodiment, the insert 200 (i.e. the whole insert 200) is left on an outer side of the reinforcing belt 150 and the ply 155.

Having such a shape for the insert has also a synergic effect with the insert 200 comprising the primary inductive component 220. It has been noticed that the magnetic coupling between the primary inductive component 220 and the secondary inductive component 320 can be made stronger, when a cross sectional area of the primary inductive component 220 is made large. Moreover, because of the shape-locking effect, at the location r2 (see above), the cross section A2 of the insert 200 is large. Thus, it has been found that the primary inductive component 220 can be placed at such a location, since there is space available precisely at that location. Therefore, in an embodiment, a plane Pmax (see FIG. 7a) intersects the primary inductive component 220. The plane Pmax is defined by its normal, which is parallel to the longitudinal direction z200 of the insert 200 and a point r2 of the plane, i.e. the plane Pmax is at the second longitudinal position r2. The second longitudinal position r2 is the position of the large cross section A2. Preferably, the large cross section A2 is also a maximal cross section Amax, as indicated in FIG. 7a. However, at least in principle, a part of the primary inductive component 220 could be arranged at the level of the cross section A2 corresponding to FIG. 5. Nevertheless this is not as preferable, since the cross sectional area of the primary inductive component 220 is preferably maximized. When the large cross section A2 is also a maximal cross section Amax, the location r2 is also a location for the maximal cross section of the insert 200.

Referring to FIG. 7a, preferably, the insert 200 comprises a body 205 and a flange 207 extending from the body 205 in at least two directions that are perpendicular to the longitudinal direction z200 of the insert 200. For example, the flange 207 may extend from the body 205 to all directions that are perpendicular to the longitudinal direction z200. Preferably the cross section of the body 205 is circular. In an embodiment, the cross section of the flange 207 is circular. These cross-sections are also defined on a plane that has a normal that is parallel to the longitudinal direction z200.

When the insert 200 comprises a flange 207, preferably at least a part of the primary inductive component 220 is arranged in the flange 207. Such an embodiment is depicted in FIGS. 7a, 7b, 8, 9a, 9b, 9c, and 9d. When the insert 200 comprises a flange 207, preferably at least a part of the primary capacitive component 210 is arranged at a longitudinal position of the flange 207. Such an embodiment is depicted in FIGS. 7a, 7b, 8, 9a, 9b, 9c, and 9d. When the insert 200 comprises a flange 207, preferably at least a part of the primary capacitive component 210 is arranged in the flange 207. Such an embodiment is depicted in FIGS. 9b, 9c, and 9d, wherein a circuit board 230 has been arranged in the flange 207, and the circuit board 230 constitutes a part of the primary capacitive component 210.

Figure 8:
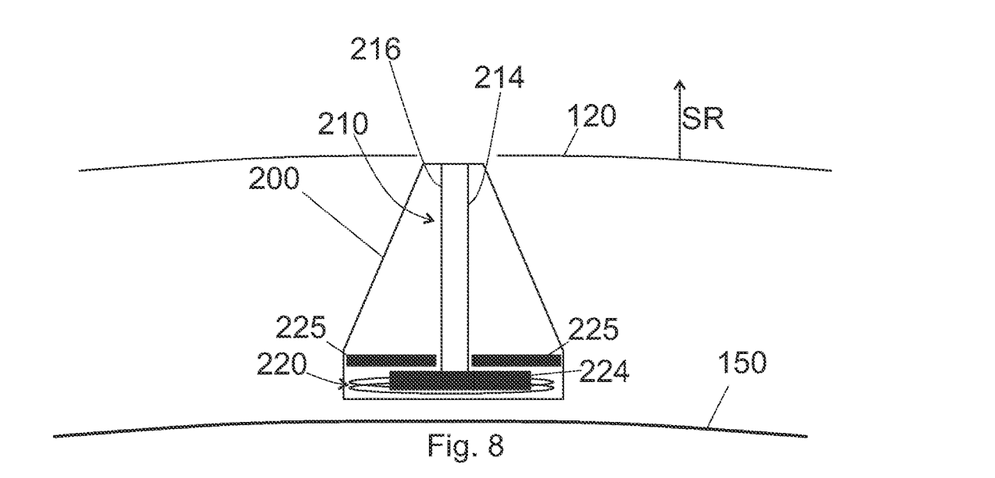
FIG. 8 shows, as a side view, a part of a tire having an insert according a fourth embodiment.
Figure 9A:
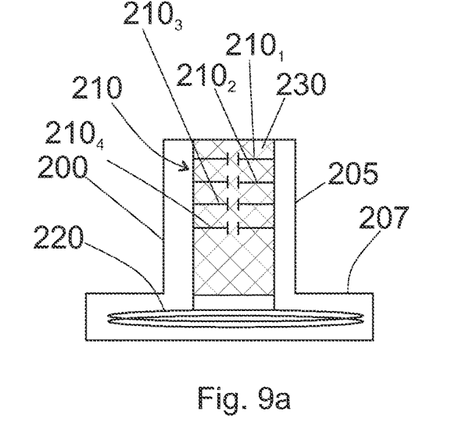
FIGS. 9a-9d show structures of primary capacitive components.
Figure 9B:
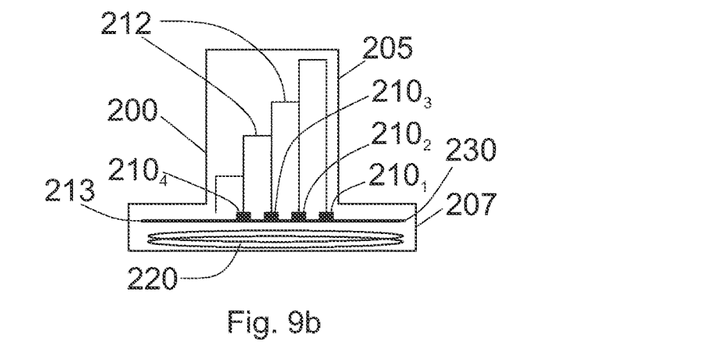
Figure 9C:
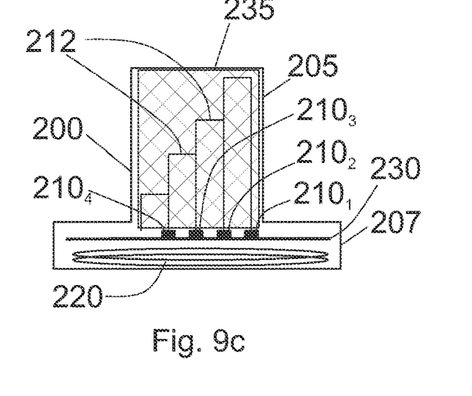
Figure 9D:
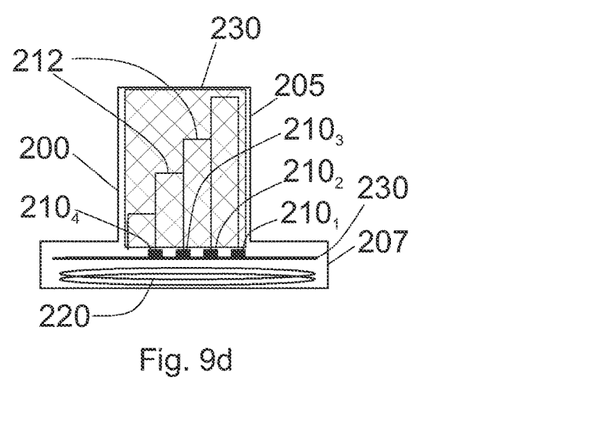

Referring to FIGS. 8 and 9b, in an embodiment, the primary capacitive component 210 comprises an electrically conductive element configured to wear with the tread 120 of the tire 100. Such an electrically conductive element may be an electrode of the capacitor. In the alternative or in addition, the electrically conductive element may be a wire 212 configured to wear.

In the embodiment of FIG. 8, the primary capacitive component 210 comprises a first electrode 214 and a second electrode 216, which together form a capacitor. Both the first electrode 214 and the second electrode are examples of an electrically conductive element configured to wear with the tread 120 of the tire 100. As the electrodes 214, 216 wear, the capacitance c0 of the primary capacitive component 210 decreases. More details of electrode configurations are given e.g. in the European patent application EP17397517.8.

In the embodiment of FIG. 9b, the primary capacitive component 210 comprises wiring 212 (i.e. wires 212). Such wiring is another example of an electrically conductive element configured to wear with the tread 120 of the tire 100. As indicated in FIG. 9b, the capacitors $210_1$, $210_2$, $210_3$, and $210_4$ are connected electrically in parallel so that the wiring 212 is connected to a first side of the capacitors and a second wiring 213 is connected to a second side of the capacitors. Moreover, as indicated in FIG. 9b, when the insert 200 wears, part of the wiring 212 also wears, whereby all the capacitors are no longer electrically in parallel. For example, as the insert 200 of FIG. 9b wears from top, first, the first side of the first capacitor $210_1$ becomes electrically insulated from the other capacitors. Next, the first side of the second capacitor $210_2$ becomes electrically insulated from the other capacitors; and so on. In this way, as the insert wears, the capacitance c0 decreases. Thus, in an embodiment, the primary capacitive component 210 comprises wires 212 that connect the capacitors $210_1$, $210_2$, $210_3$, $210_4$ electrically in parallel. At least some of the wires 212 are configured to wear off with the tire 100. When the wires 212 wear, an electrical connection in between at least two capacitors $210_1$, $210_2$, $210_3$, $210_4$ breaks. This changes a capacitance c0 of the primary capacitive component 210. Referring to FIG. 9c, the wires 212 may be arranged on a circuit board 230, 235. In case the capacitors $210_1$, $210_2$, $210_3$, $210_4$ are arranged on a first circuit board 230, the wiring may be (but need not to be) arranged in or on the first circuit board 230 or in or on a second circuit board 235. The capacitors $210_1$, $210_2$, $210_3$, and $210_4$ may be discrete capacitors, i.e. electronic components.

Figure 9E:
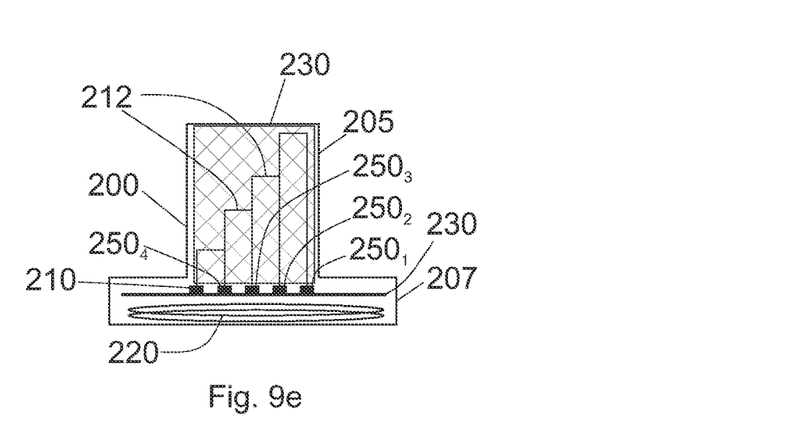
FIGS. 9e shows a structure of a primary resistive component.

Referring to FIG. 9e in an embodiment, the primary resistive component 250 comprises resistors $250_1$, $250_2$, $250_3$, and $250_4$. The resistors may be connected electrically in parallel with the wires 212, 213, as detailed above for the capacitors $210_1$, $210_2$, $210_3$, and $210_4$. Thus, as the insert 200 wears, the wiring 212 will break, leading to increased resistance of the primary resistive component 250. As indicated in FIG. 2g. the resistors themselves may, in the alternative, wear off, as the insert 200 wears.

Referring to FIGS. 7b and 9a, in an embodiment, the primary capacitive component 210 comprises capacitors $210_1$, $210_2$, $210_3$, and $210_4$ that are configured to wear with the tread 120 of the tire 100. The capacitors $210_1$, $210_2$, $210_3$, and $210_4$ may be discrete capacitors, i.e. electronic components. As indicated in FIGS. 7b and 9a, the capacitors $210_1$, $210_2$, $210_3$, and $210_4$ are connected electrically in parallel. When the insert 200 wears, first the first capacitor $210_1$ wears off, and in this way the capacitance decreases. Next, the second capacitor $210_2$ wears off, and in this way the capacitance further decreases; and so on. The capacitors may be arranged on a circuit board 230, as indicated in FIG. 9a. The capacitors need not be arranged on a circuit board, as indicated in FIG. 7b.

Referring to FIGS. 9a to 9c, in an embodiment, the insert 200 comprises a first circuit board 230 and capacitors $210_1$, $210_2$, $210_3$, and $210_4$ attached to the first circuit board 230. As indicated above, the capacitors $210_1$, $210_2$, $210_3$, and $210_4$ may be connected electrically in parallel. Preferably the first circuit board is a flexible circuit board. This helps manufacturing of the insert 200. Even if FIGS. 7a, 7b, 9a, 9b, 9c, and 9d show only four capacitors $210_N$, wherein N=1, 2, 3, or 4, the number of capacitors comprised by the primary capacitive component 210 may be freely chosen according to the needs. For example, the number of capacitors $210_N$ comprised by the primary capacitive component 210 may be exactly two, at least two, exactly three, at least three, exactly four, at least four, exactly five, at least five, exactly six, at least six, or more than six. Because the space available for the capacitors may be limited, the number of capacitors $210_N$ may be e.g. less than 5000.

A flexible circuit board may comprise one of polyethylene terephthalate, polyimide, polyethylene naphthalate, and polyetheretherketone.

The magnetic coupling between the primary inductive component 220 and the secondary inductive component 320 should be sufficiently high. This can be affected e.g. by the structure on the primary inductive component 220. The primary inductive component 220 may comprise a primary coil 222. The primary coil 222 may be have been formed of electric wire by winding. The primary coil 222 may be formed as wiring of a circuit board. Typically, higher inductances are achievable by having a wound coil 222. The primary coil 222 may comprise e.g. at least ten turns, irrespective of the type of the primary coil 222.

Referring to FIG. 8, the magnetic coupling may be improved also be using a primary core 224 and/or a primary plate 225. FIG. 8 shows an embodiment having both the primary core 224 and the primary plate 225. An embodiment comprises only one of these. [i] The primary core 224, [ii] the primary plate 225, or [iii] the primary core 224 and the primary plate 225 comprise(s) paramagnetic or ferromagnetic material. The primary core 224 is arranged in such a way that the primary coil 222 laterally surrounds the primary core 224. The primary plate 225 is arranged in such a way that a magnetic field formable by the primary coil would penetrate the primary plate 225. E.g. a central axis of the primary coil 222, about which the turns of the primary coil 222 turn, penetrates the primary plate 225; and a distance between the primary plate 225 and the primary coil 222 is small, e.g. at most 10 mm or at most 5 mm. Moreover, the primary plate 225 is arranged on such a side of the primary coil 222 that at least a part of the primary coil 222 is left in between the primary plate 225 and the secondary inductive component 320 of the interrogator 300. Correspondingly, in the embodiment of FIG. 8, the interrogator 300 would be, in use, arranged as indicated in FIG. 2a1, i.e. on the side of the reinforcing belt 150. In this way, the primary core 224 and/or the a primary plate 225 are/is arranged in magnetic connection with the primary coil 222. This increases the inductance of the primary coil 222 and improves the magnetic coupling between the inductive components 220, 320.

Figure 10:
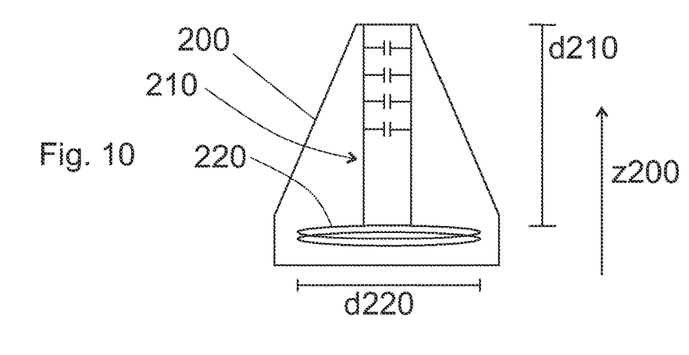
FIG. 10 shows measures of a typical insert.

FIG. 10 shows preferable measures of an insert 200. Such measures are applicable in particular for and insert 200 for a passenger car. Heavy tires, i.e. tires for larger vehicles, such as earth mover machines, may have larger inserts.

FIG. 10 shows a dimension d220 of the primary inductive component 220 in a direction that is perpendicular to the longitudinal direction z200. The dimension d220 may be e.g. a diameter of a primary coil 222. The dimension d220 may be e.g. a length of a diagonal of a primary coil 222. In an embodiment, the dimension d220 of the primary inductive component 220 is at least 5 mm, such as from 5 mm to 50 mm. This dimension has been found proper in view of the magnetic coupling between the inductive components 220, 320. Preferably, the dimension d220 is from 5 mm to 15 mm. This applies e.g. to passenger car tires. In a tire for larger machines, the dimension may be greater.

FIG. 10 shows a dimension d210 of the primary capacitive component 210 in a direction that is parallel to the longitudinal direction z200. The dimension d210 may be e.g. substantially equal to a length of the body 205 (see FIG. 7a). In an embodiment, the dimension d210 of the primary capacitive component 210 is at least 3 mm. This dimension is particularly suitable, when the primary capacitive component 210 is configured to wear. In this case, a value of wear could be detected for a length of 3 mm. For example, the insert 200 could be arranged relatively deep in an unworn tire 100, and such an insert could measure only the last 3 mm of wear (last before the tire 100 is completely worn). However, preferably, the dimension d210 of the primary capacitive component 210 is larger so that the wear can be measured throughout the service life of the tire 100. Therefore, in an embodiment, the dimension d210 of the primary capacitive component 210 is at least 6 mm or is at least 8 mm. However, the insert 200 may affect the properties of the tire 100, if it is too large. Therefore, in an embodiment, the dimension d210 of the primary capacitive component 210 is from 3 mm to 100 mm. However, preferably, the insert does not penetrate the reinforcing belt 150. Thus, in passenger car tires, the dimension d210 may be e.g. from 3 mm to 25 mm, such as from 6 mm to 15 mm.

Figure 12A:
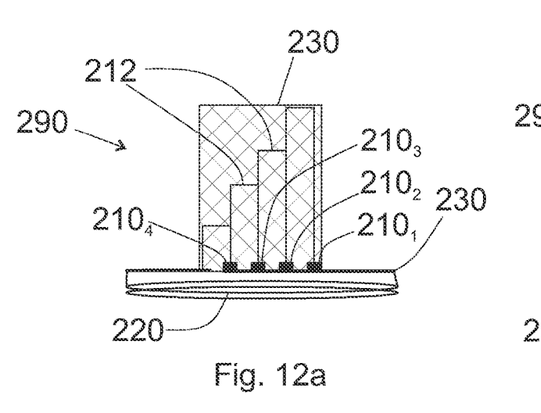
FIG. 12a shows a circuit comprising electronic components of the insert.
Figure 12B:
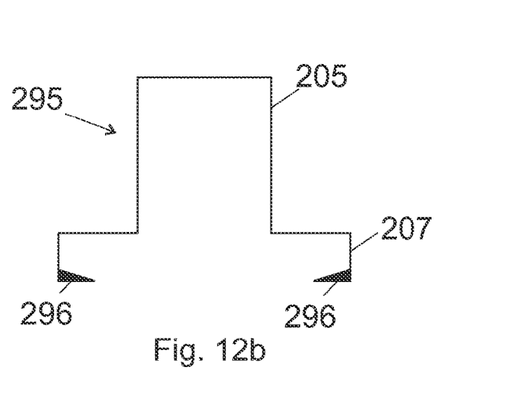
FIG. 12b shows a shell for receiving the circuit of FIG. 12a, and FIG. 12c shows an insert formed by arranging the circuit into the shell.
Figure 12C:
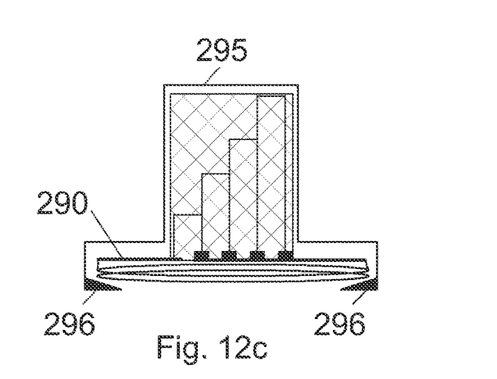

Referring to FIGS. 12a to 12c, the insert 200 may be made e.g. such that the circuit 290, which comprises the electronics of the insert 200, is made separately from a shell 295 of the insert 200. Correspondingly, the circuit 290 comprises at least the primary capacitive component 210 and the primary inductive component 220. The circuit 290 may further comprise the primary resistive component 250, at least a circuit board (230, 235), and/or the primary sensor arrangement 240. The shell 295 be a hollow object having an outer shape as discussed above, and an inner shape suitable for receiving the circuit 290. The insert 200 may be manufactured by inserting the circuit 290 into the shell 295. Thus, in an embodiment, the insert 200 comprises the circuit 290 and the shell 295. The shell 295 may surround the circuit at least laterally, i.e. in directions perpendicular to the longitudinal direction z200 (e.g. radially). After inserting the circuit 290 into the shell 295, the shell may be filled with a material that can be cured to form polymer. What has been said about the material of the insert 200 applies to the material of the shell 295 and/or to the material that is used to fill the shell 295 (if any).

In an embodiment, the shell 295 comprises a locking part 296 configured to lock the circuit 290 into its place, once inserted into the shell 295. The shape of the locking part 296 may be adapted e.g. to the shape of the primary inductive component 220.

In an embodiment, the shell 295 (or the insert 200 if it does not comprise a separate shell 295), is free from sharp corners. In this context a corner is sharp, if it has a radius of curvature of less than 1 mm. Thus, in an embodiment, the shell 295 (or the insert 200 if it does not comprise a separate shell 295), comprises only such corners, of which radius of curvature is at least 1 mm, preferably at least 2 mm. Such an inserts grinds the tire less than an insert with sharp corners.

The invention claimed is:

1. A tire configured to rotate about an axis of rotation, the tire comprising:
   a tread block made of tread material,
   a tread, of which a part is formed by the tread block, the tread being configured to form a contact with a surface, when the tire is used,
   an insert comprising
      a primary capacitive component and
      a primary inductive component, wherein
   the insert extends in a longitudinal direction from a bottom of the insert to a top of the insert,
   the longitudinal direction being parallel to or forming an angle of at most 75 degrees with a radial direction of the tire at the location of the insert, the insert has a first cross section at a first longitudinal position and a second cross section at a second longitudinal position, wherein
the first longitudinal position is located closer to the tread of the tire than the second longitudinal position and
the second cross section is greater than the first cross section, and
at least a part of the top of the insert does not form an interface with the tread material.

2. The tire of claim 1, wherein
at least a part of the primary inductive component is arranged a second distance towards the interior of the tire from the tread, the tire further comprising
an interrogator comprising
an electric source,
a communication circuit, and
a secondary inductive component, wherein
the secondary inductive component is arranged on the same side of the tread as the primary inductive component and
at least a part of the secondary inductive component is arranged a third distance apart from the tread, the third distance being greater than the second distance.

3. The tire of the claim 1, comprising
a reinforcing belt, such as a steel belt, such that
the insert is left on an outer side of the reinforcing belt preferably, the tire further comprises
a ply or plies comprising fibrous material.

4. The tire of claim 1, wherein
a plane that has a normal parallel to the longitudinal direction of the insert and is at the second longitudinal position intersects the primary inductive component; preferably
the second cross section is a maximal cross section of the insert.

5. The tire of claim 1, wherein the insert comprises a body and a flange extending from the body in at least two directions that are perpendicular to the longitudinal direction of the insert.

6. The tire of claim 5, wherein at least a part of the primary inductive component and/or at least a part of the primary capacitive component is arranged in the flange.

7. The tire claim 1, comprising a blind hole arranged in the tread block, wherein at least a part of the insert is arranged in the blind hole.

8. The tire of claim 1, comprising adhesive in between the insert and the tread block.

9. The tire of claim 1, wherein
the primary inductive component comprises
a primary coil and
a primary core and/or a primary plate, wherein
the primary core and/or the primary plate are/is arranged in magnetic connection with the primary coil, and
the primary core and/or the primary plate comprise or comprises paramagnetic or ferromagnetic material.

10. The tire of claim 1, wherein the insert is energetically passive.

11. The tire of claim 1, comprising
a first circuit board and
capacitors attached to the first circuit board; preferably, the first circuit board is a flexible circuit board.

12. The tire of claim 11, wherein the capacitors are connected electrically in parallel and at least some of the capacitors are configured to wear of as the tire wears.

13. The tire of claim 11, wherein the primary capacitive component comprises wires that connect the capacitors electrically in parallel and
at least some of the wires are configured to wear of as the tire wears thereby breaking an electrical connection in between at least two capacitors and changing a capacitance of the primary capacitive component;
in an embodiment,
the wires are arranged in or on the first circuit board or a second circuit board.

* * * * *